United States Patent Office 2,768,889
Patented Oct. 30, 1956

2,768,889
AGRICULTURAL COMPOSITION

Jeremiah F. Twomey, St. Boniface, Manitoba, and Frank H. Peto, West Vancouver, British Columbia, Canada No Drawing. Application February 18, 1952, Serial No. 272,254

Claims priority, application Canada February 4, 1952

10 Claims. (Cl. 71—2.4)

This invention is directed to an agricultural composition and more particularly to a composition containing a physiologically active plant hormone and added ingredients effective to counteract at least in part detrimental effects upon crops caused by the hormone.

In Canadian Patent 431,348 bearing date the 20th day of November, 1945, Zimmerman et al. described a class of phenoxy compounds which are effective as plant hormones. The class may be more particularly described as comprising substituted phenoxy acids, their methyl and ethyl esters, amides and salts which are characterized by the presence of one or more of the members including chlorine, bromine, iodine, methyl, amino and nitro groups substituted for hydrogen on the benzene ring. The substituted phenoxy compounds are further characterized by a side chain connection to the oxygen on the benzene ring of an acid of the paraffin series such as formic, acetic, and propionic acids, as well as their methyl and ethyl esters, amides and salts.

The most effective plant hormones are the halogen substituted phenoxy monocarboxylic aliphatic acids. The salts, esters and amides of such substances are expected to be approximately equivalent in efficiency and the choice will depend largely on factors of volatility, solubility, ease of application and commercial availability. Of the halogen substituted phenoxy monocarboxylic aliphatic acids, the compounds including chlorine substituted in the para position such as 2,4 dichlorophenoxyacetic acid and 2,4,5 trichlorophenoxyacetic acid are known to give rise to a particularly efficient growth stimulating response.

When plant hormones of the type referred to are used in larger amounts it has been established by Sexton et al., Canadian Patents 464,991 and 464,992 and Jones 464,780 that a herbicidal effect will be produced which is effective to control weeds and in particular broad leaf weeds. It was noted by these workers that either a slight increase in the growth of the crops or no substantial impairment of growth accompanied the use of substances such as 2,4-dichlorophenoxyacetic acid (2,4-D) as a herbicide. The chemistry involved in the herbicidal action of substances such as 2,4-D is not fully understood, but we believe that the growth rate is increased to such an extent that the chemical balance within the plant is upset and the plant has insufficient quantities of certain necessary elements to sustain it under the conditions which have been created.

In the case of weeds, and particularly in the case of broad leaf weeds, disturbance of the chemical balance and deficiency within the plant occur to a degree which results in the death of the plant. In the case of crops such as grain we have found that there is a similar disturbance of the chemical balance and occurrence of deficiency within the plant with respect to certain elements. While this disturbance and deficiency is normally insufficient in degree to destroy the crop, it has the result that the growth promoting of the hormone is offset, and either there is a decrease in the size of the crop due to the hormone having a damaging effect, or there is an increase which is far less than could have been achieved by the hormone had the occurrence of deficiency within the plant and the disturbance of the chemical balance not taken place in the crop.

As a result of tests which have involved a wide variety of soil conditions, crops and formulations, we have discovered that the disturbance of the chemistry of the crop and the deficiency within the plant can be largely overcome by supplying with the substance such as 2,4-D a small amount of minor elements and in particular boron, magnesium, zinc, copper, iron and cobalt and molybdenum. If the deficiencies of these minor elements are supplied the plant will normally be capable of absorbing from the soil increased quantities of the major elements such as nitrogen, potassium and phosphorus; although it may of course be advisable to add additional quantities of the major elements if the soil is particularly lean in these elements. We have found that the minor elements can most advantageously be supplied to the crop by formulating a composition with the 2,4-D or similar substance containing about 6% of 2,4-D and a few percent of each of the minor elements, together with an inert carrier or substances such as N, P, K, S, Mg, Na, Ca, and spreading this as a dust in the amount of 6 or 7 pounds to an acre so that the minor elements are leaf fed with the 2,4-D and are immediately available to supply deficiencies within the plant when the 2,4-D starts to act on the plant. Alternatively the 2,4-D or a similar substance and the minor elements can be applied in the form of a spray.

It will be appreciated that particular varieties of crops may require a smaller amount or none of certain of the minor elements. The soil conditions may also have an indirect influence on the requirements of minor elements; however, on the basis of extensive experiments which have been carried out, we believe that the soil conditions are less important in this respect than the variety of plant. Although we do not wish to limit ourselves to any particular scientific authority explaining the empirical results which we have obtained, we believe that a reasonable hypothesis can be advanced to explain the results which we have obtained. The importance of minor elements may be due at least in part to an increase in the enzyme activity in the plant caused by substances such as 2,4-D. Consequently the plant requires immediately available additional supplies of helpers such as boron, magnesium, zinc, copper, iron, cobalt during the period of accelerated growth. Sulphur and phosphorus probably contribute to the correction of deficiencies in the chemistry of the crop in a somewhat different manner, since it is required for the formation of protein.

When a plant hormone such as 2,4-D is applied to the crop there is an immediate acceleration of the growth rate, including, as has been explained, an increase in the enzyme activity, with the consequence that under the artificial conditions which have been created the plant immediately requires far more than the normal amounts of minor elements. With particular varieties of plants and under favourable soil conditions there may be a sufficient excess over the normal requirements of the plant of one or more of the minor elements to sustain the plant in spite of the increased growth rate. In the vast majority of cases, however, there will not be sufficient of each of the minor elements available to sustain the plant. A deficiency within the plant of a particular minor element may occur due to any one of several reasons. The soil may be deficient in a particular element, with the consequence that the plant has been able to absorb a barely sufficient quantity of that element for its normal requirements, and there is no reserve within the plant available to meet the new demands. Even if the soil is abundantly supplied with the particular minor element, the nature of the plant may be such that it has not built up reserves of that element in excess of its normal requirements. Consequently there is insufficient time for the plant to absorb from the ground sufficient quantity of the particular element to satisfy the requirements of the accelerated growth rate. Even if adequate supplies of the particular element are contained within the plant the rate of translocation of the element within the plant may be too low to keep pace with the increased growth rate. In other words, the reserves may be centred elsewhere within the plant and yet there may be a deficiency in the leaves under the conditions artificially created by the use of the hormone.

It will be appreciated from the foregoing that variations in the preferred general purpose formulation may be found to be particularly effective with specific types of crops. With a specific type of crop the requirements for one of the minor elements may be unusually high, whereas for another of the minor elements it may be negligible. Variations which represent the application of the principles of the present invention to the problems occurring in connection with specific types of crop are contemplated as falling within the ambit of the present invention, when considered in its broadest aspect. Variations in the preferred formulation may also be desirable under particular soil conditions; however, these are believed, generally speaking, to be less significant than variations in the type of crop because, as has been seen, even if the soil is abundantly supplied with a particular minor element there will still be a deficiency within the plant when the growth rate of the plant has been accelerated if the nature of the plant is such that the plant has not built up reserves or the rate of translocation of the reserves within the plant is insufficient.

We have attempted, in accordance with the preferred embodiment of this invention, to provide a formula which, on the basis of extended experimental work, may be expected to give good results over a wide variety of types of crops and soil conditions. When further experimental work has been carried out we believe that a further increase in efficiency will be obtained by providing formulations which are specifically adapted to species of crops. It will be appreciated that the beneficial effects due to the application of the principles of this invention occur over a range of quantities of 2,4-D or similar substance. If a small amount of 2,4-D is applied the beneficial effect is achieved of promoting the growth increment caused by the hormone. If a larger amount of 2,4-D is applied the beneficial effect is achieved of lessening the damaging effects of 2,4-D upon the economic crop.

An additional advantage of the present invention has been noted. It has been found that there is a tendency on the part of the plant to deposit more of its protein in the economically desired portions, i. e., in the kernel of the wheat.

Strangely it has also been observed that the novel composition of matter causes a reduction in the amount of some excessive nutrients such as calcium and sodium deposited in the kernel. In this way, the other desirable nutrients in the plant are permitted to express their maximum inherent chemistry and promote photosynthesis by this decrease of the excessive alkali buffering elements such as sodium and calcium.

Further advantages of the present invention include obtaining a higher yield. This increased yield is often due to a higher percentage of grain out of the total growth. Also increased production of protein may be achieved, and in many cases it has been found that plants treated in accordance with the present invention matured at an earlier date than untreated plants.

The beneficial effects obtained in accordance with the present invention are dependent to a degree upon the maturity of the plant at the time when it is treated. Generally speaking, plants are more sensitive to substances such as 2,4-D at an early stage of growth than at a later stage. The beneficial effects of the present invention are most striking where a plant has been treated at an early stage of its growth.

*Example 1*

Experiment I shows the results of early experiments with the addition of 2,4-D hormone of sulphur and the minor elements individually. It will be noted that in general variations were obtained in the number of kernels per rod row in the yield in the percentage of protein in the amounts of N, P and K absorbed in the kernels, and that there was a decrease in the absorption of Ca and Na.

Dusts applied to a field of Marquis spring wheat, second crop, at the pre-shot blade stage, near Lethbridge, Alberta, eight one-mile strips, thirty-three feet wide were dusted with treatments itemized below; four rod row plots were harvested from the treated strips and figures presented are their averages. Several of the treatments, particularly ones using S, B, Zn and Cu, were noticeably earlier than the check. Strip treated with Co and 2,4-D had a more reddish golden colour as compared to bleached straw of check. Check strip was dusted with approximately six pounds of 5 percent acid equivalent 2,4-D isopropyl ester. Carrier in this dust consisted of 50 percent by weight of talc, 10 percent Attaclay, 33.75 percent bentonite and 6.25 percent ester acetate. Treatment No. 1 contained 5 percent ester of 2,4-D, 5 percent iron sulfate approximately 250 mesh, 45 percent talc, 10 percent Attaclay, 33.75 percent bentonite, and 6.25 percent acetate. Approximately six pounds of this dust were applied per acre. Treatment No. 2 contained 5 percent Co sulfate and 45 percent talc. Treatment No. 3 contained 25 percent flower of sulphur and 25 percent talc. Treatment No. 4 contained 7 percent borax and 43 percent talc. Treatment No. 5 contained 7 percent zinc sulfate and 43 percent talc. Treatment No. 6 contained 9 percent monohydrated copper sulfate and 41 percent talc. Treatment No. 7 contained 7 percent manganese sulfate and 43 percent talc.

Figures under check are the pounds per acre utilized (analysis X yield) by kernels of N, P, K, Ca, Na and potash. Results for the seven treatments are expressed comparatively in percentages + or − of the checks in the accompanying chart, which is Table I.

TABLE I

|  | Number of kernels per rod row | Yield in lbs. per acre | Percentage protein | Amt. of N in lbs. per acre used by kernels | Amt. of P in lbs. per acre used by kernels | Amt. of K in lbs. per acre used by kernels | Amt. of Ca in lbs. per acre used by kernels | Amt. of Na in lbs. per acre used by kernels | Total ash in lbs. per acre used by kernels |
| --- | --- | --- | --- | --- | --- | --- | --- | --- | --- |
| Check 2,4-D only | 4,150 | 1,328 | 11.8 | 27.5 | 5.153 | 2.22 | 1.062 | 2.88 | 21.65 |
| Treatment 1—2,4-D and Fe sulfate | +16 | +23 | −20 | 0 | +38 | +45 | −8 | −73 |  |
| Treatment 2—2,4-D and Co sulfate | +24 | +18 | +23 | +45 | 0 | +19 | −11 | −52 |  |
| Treatment 3—2,4-D and flower of sulfur | +23 | +15 | +16 | +30 | +17 | +40 | +45 | −60 |  |
| Treatment 4—2,4-D and borax | +20 | +10 | +20 | +30 | 0 | +30 | −31 | −63 |  |
| Treatment 5—2,4-D and Zn sulfate | +6 | −10 | +29 | +17 | 0 | +32 | −44 | −54 |  |
| Treatment 6—2,4-D and Cu sulfate | +20 | −12 | +29 | +13 | −12 | +5 | −56 | −58 |  |
| Treatment 7—2,4-D and Mn sulfate | 0 | 0 | +28 | +28 | 0 | +19 | −25 | −77 |  |

Experiments subsequent to those set forth in Example 1 established that a mixture of plant hormones and a range of the minor elements gave more satisfactory results than where the hormone was used with an individual minor element. Generally speaking, the preferred formulation of a plant hormone and a range of minor elements will be more effective if there are ample reserves of moisture and plant foods available in the foil. This conclusion is illustrated by the experiments briefly summarized in Example 2.

Example 2(a)

Sugar beet stecklings were dusted with 10 pounds of dust to an acre containing .025% acid equivalent of ester of 2,4-D and a blend of borax, manganese sulphate, copper sulphate, ferrous sulphate, magnesium sulphate, potassium sulphate, sulphur, calcium cyanamide and phosphate fertilizer. An increase of 23% in seed production was obtained over their adjacent checks at a portion of the field where winter drainage had been good, and where there had been an ample moisture supply during the summer. At another portion of the field where there had been poorer winter drainage and where the test strips were located at some distance from the irrigation dyke to give a limited moisture supply there was no substantial improvement over the checks.

Example 2(b)

A similar finding was obtained in the case of spring wheat treated at Lethbridge, Alberta, with 7 to 14 pounds to an acre of dust containing 4% acid equivalent of 2,4-D ester and minerals set out below as Formulas A, B and C. Little yield differences were obtained when the wheat was growing on land on which a corn crop had previously been raised, making it likely that there was a shortage of available nitrogen. However, when the same treatments were applied to wheat growing on land preceded by alfalfa, whereby higher nitrogen reserves would be present, consistent yield increases were obtained up to 18% improvement over check treatments containing 2,4-D only.

Formula A:

5% of ester of 2,4-D (4% acid equivalent).
5% borax
5% ferrous sulphate.
5% manganese sulphate.
5% zinc sulphate.
5% copper sulphate.
20% sulphur.
22% calcium cyanamide.
10% Attaclay.
8% phosphate fertilizer (11/48).

Formula B was similar to Formula A with the addition of 2½% cobalt sulphate.

Formula C was the same as Formula A with the addition of 1% potassium iodide, and 3% potassium bromide.

In a test carried out at Lethbridge, soil fertilized with 40 pounds of phosphate fertilizer (11/48) and treated with a fortified dust similar to Formula A showed yield increased up to 8 bushels an acre as compared with plots treated only with an equivalent amount of 2,4-D. Similarly in Saskatchewan a part of a field fertilized with ammonium phosphate (11/48) showed an improved growth response to Formula A as compared with sections of the field which were not fertilized.

General field observations across Western Canada and Northwest United States have shown that the best growth responses were obtained when fortified dusts of the type of Formula A are used on small grains growing on summer fallow with high nutrient and moisture reserves than on small grains growing on land that has been cropped in the previous years. The general conclusion may be drawn that the more vigorously a crop is growing at the time of application of the blend of plant hormone and minor elements the greater will be the consequent yield increase.

The state of growth at which the composition in accordance with the present invention is applied has a bearing on the extent to which beneficial results are obtained. Preferably, small grains such as wheat, oats, barley, rye and flax should be treated when the plants are young to obtain the best growth responses, thus grain treated at the "three-leaf" stage and flax treated when one or two inches tall gave better growth increases than when the treatment was applied at a later stage. Example 3 illustrates the application of the foregoing principle.

Example 3

In experiments carried out in Saskatchewan 6 pounds of Formula B dust applied to spring wheat on June 11th with the wheat approximately at the "three-leaf" stage yielded 42 bushels to an acre as compared with 20.9 bushels an acre with an equivalent amount of 2,4-D dust only. A similar treatment applied to a different plot in the same field two weeks later, yielded 31.9 bushels of wheat as compared with a check of 26 bushels to an acre where dust containing 2,4-D only was applied.

As has been generally indicated in the preceding portion of this specification when 2,4-D or similar substances are applied in sufficient quantities to have a herbicidal action on the accompanying weeds, from slight to serious damage to the crop results, depending upon the crop kind, variety, speed and stage of growth. Thus where 7 pounds of a composition containing 4% acid equivalent of 2,4-D ester Attaclay and talc was applied at Lethbridge the yield of wheat was reduced to 2.4 bushels an acre, 1.9 bushels an acre, and 1.6 bushels an acre respectively in three tests. Similarly, oats treated at Edmonton with approximately 7 pounds of 5% acid equivalent of 2,4-D in Attaclay and talc resulted in a reduction in yield of 16 bushels an acre as compared with the section of the field which received no treatment.

The beneficial effects of the present invention may be illustrated by the tests set out in Example 3(a), which were carried out at the Dominion Experimental Farm, Lethbridge, Alberta.

Example 3(a)

| Crop | Treatment | Recovery, bu. per acre | Yield in check containing 2,4-D only, bu. per acre | Yield difference, bu. per acre |
| --- | --- | --- | --- | --- |
| Spring wheat | 7 pounds per acre, Formula A. | 28.7 | 24.2 | 4.5 |
| Do | 8 pounds per acre, Formula B. | 26.4 | 24.2 | 2.2 |
| Do | 8 pounds per acre, Formula C. | 28.2 | 24.2 | 4 |

It was reported that the check plots containing no treatment lodged readily and quite severely, the check plots treated with 2,4-D dust only and without the addition of the minor elements lodged next, and the plots treated with the additive dust were most resistant to lodging.

The foregoing test results were confirmed by increased recoveries of 5 to 6 bushels an acre obtained with Formula A in tests carried out at Indian Head, Saskatchewan, and by the results previously mentioned showing an increase of 21 bushels an acre over a check of 20.9 bushels an acre. Also it was found in tests carried out at Edmonton that Formula A applied in the proportion of approximately 6 pounds an acre to barley, yielded 56.3 bushels an acre as compared with a check treated with 2,4-D dust only which yielded 50 bushels an acre. Thus an increase of 6.3 bushels an acre was obtained.

In Example 4, a selection of typical results are shown. These were obtained by treating plots with 4 to 8 pounds of a dust approximately equivalent to Formula A but having a slightly smaller percentage of manganese sulphate. In each case, the check plots of the same field was treated with approximately the same amount of 2,4-D.

Ten square yards in each plot were harvested. Dr. D. Brown of the experimental farm, Brandon, analysed these tests. T & T Seeds and Chemicals Ltd. Agronomist B. Volkers further calibrated the figures to bushels per acre.

*Example 4*

| I<br>Place | II<br>Grain | III<br>Check | IV<br>Dust | V<br>Increase, bus. | VI<br>In percent |
|---|---|---|---|---|---|
| Oak Lake | Flax | 5.3 | 6.9 | 1.6 | 30.19 |
| Meadows | do | 9.5 | 13.0 | 3.5 | 36.84 |
| Dauphin | do | 12.55 | 17.9 | 5.35 | 42.55 |
| Milden, Sask | do | 12.75 | 16.55 | 3.8 | 21.96 |
| Arborfield, Sask | Wheat | 36.75 | 48.9 | 12.15 | 33.06 |
| Grandview, Man | do | 38.5 | 45.5 | 7 | 18.18 |
| Dauphin | Rye | 11.95 | 15.9 (6# per acre) | 3.95 | 33.05 |
| Do | do | 11.95 | 17.2 (12# per acre) | 6.25 | 52.30 |
| Do | Wheat after Flax | 39.25 | 58.10 | 18.85 | 48.02 |
| Elbow Lake, Minn | Barley | 40.4 | 54.6 | 14.2 | 35.14 |
| Dauphin, Man | Wheat | 33.25 | 42.75 | 9.5 | 28.57 |

The beneficial results obtained by the use of the present invention are illustrated by the report from Montana that there was thereby obtained wheat which was 58 to 62 pounds per bushel heavier, had bigger heads and better colour. The stubbled in wheat was reported as being increased by 3 bushels and the summer fallow by 7 bushels. Another report stated that the treated spring wheat matured more than a week earlier, was more even and of a higher grade than the remainder of the field. Similarly, 3 bushels increase of yield of flax was reported and 12% increase in yield on thatcher wheat. In the case of thatcher wheat, a substantial increase in protein content was also reported. More extensive root development in the case of wheat and a better color and heavier stems and joints have also been reported.

Example 5 shows the improvements obtained with formulas in accordance with this invention and containing the combination of a plant hormone and minor elements, other than in accordance with a preferred formula.

*Example 5*

Dominion Experimental Farm, Lethbridge, Alberta.

*Check 1.*—8 pounds per acre of 5% acid of 2,4-D ester in Attaclay and talc on spring wheat gave an average yield of 26.1 bushels per acre.

*Treat 2.*—8 pounds per acre of 5% acid of 2,4-D ester containing 10% $FeSO_4$ and 7% $CuSO_4$, 5% $CoSO_4$ balance talc, gave an average of 32.8 bushels per acre, an increase of 6.7 bushels per acre.

*Treat 3.*—8 pounds per acre of 5% acid of 2,4-D ester containing 10% $FeSO_4$ and 7% $CuSO_4$, balance talc, gave an average yield of 34.1 bushels per acre, an increase of 8 bushels per acre.

The field notes show that with treatment 2 the leaves yellowed considerably. In the case of treatment 3 the plants were noticeably greener than the other plots.

Example 5(a) shows some further results obtained with variations of the preferred formula. The results of Example 5(a) show the importance of adapting the formula to the species rather than to the soil types.

*Example 5(a)*

Dominion Experimental Farm, Melfort, Saskatchewan.

All treatments approximately 7 pounds dust per acre.

*Treatment D1.*—Formula A, 5% acid equivalent of 2,4-D plus 1% molybdenum yielded 27.0 bushels wheat per acre 76.4 bushels oats, per acre.

*Treatment D2.*—Check with 5% acid of 2,4-D in Attaclay and talc yielded 27.9 bushels of wheat per acre, 61.5 bushels of oats per acre.

*Treatment D3.*—Formula A, 5% acid equivalent of 2,4-D ester plus 1% molybdenum plus 7% $CuSO_4$ yielded 44.2 bushels of wheat per acre, 72.8 bushels per acre of oats.

Treatment D1 increased oats 14.9 bushels per acre but did not change the wheat yield in comparison with check treatment D3. Increased oats 11.3 bushels per acre and increased the wheat yield 16.3 bushels over check.

*Example 6*

Three duplicate experiments were harvested with 6 paired plots for each treatment. A series of dusts were all standardized to 4% acid of 2,4-D ester and applied at approximately 7 lbs. per acre on Rescue Spring Wheat at Kindersley, Sask., Carleton Durham Wheat at Virden, Manitoba, Redmon Spring Wheat, Dauphin, Manitoba.

Formulations were as follows:

No. 1—check Attaclay and talc
No. 2—plus 5% $FeSO_4$
No. 3—plus 5% $FeSO_4$, 5% $MnSO_4$
No. 4—plus 5% $FeSO_4$, 5% $MnSO_4$, 4% $CuSO_4$.
No. 5—plus 5% $FeSO_4$, 5% $MnSO_4$, 4% $CuSO_4$, 2½% $CoSO_4$
No. 6—plus 5% $FeSO_4$, 5% $MnSO_4$, 4% $CuSO_4$, 2½% $CuSO_4$, 2½% $NiSO_4$
No. 7—plus 25% of 11–48–0 phosphatic fertilizer

| Treatment | Yield at Kindersley in Bus. per acre | Yield at Virden in Bus. per acre | Yield at Dauphin in Bus. per acre |
|---|---|---|---|
| No. 1 | 21.39 | 27.80 | 25.43 |
| No. 2 | 26.31 | 31.30 | 26.44 |
| No. 3 | 32.75 | 30.12 | 32.07 |
| No. 4 | 32.00 | 31.26 | 29.62 |
| No. 5 | 31.32 | 33.44 | 28.58 |
| No. 6 | 29.93 | 20.11 | 24.37 |
| No. 7 | 24.70 | 32.70 | 35.20 |

There was some frost damage on the Kindersley samples. Yield was particularly cut on No. 5 as it was slightly later in maturity.

*Example 6(b)*

At Dauphin, Manitoba, 1951, oats 10 dusts were standardized to 4% acid equivalent of ester of 2,4-D applied to ground oats at approximately 7 lbs. per acre. Base dust with the exception of the checks A2—A5—A8 were our standard Formula A. The variations between treatments were obtained by doubling the percent of 1 element in each formula yields are the average of 6 replicates on each treatment.

A1—43.5 bus. oats per acre, Formula A base
A2—29.2 bus. oats per acre, check talc and Attaclay
A3—36.7 bus. oats per acre, double percent of borax
A4—37.7 bus. oats per acre, double percent of $FeSO_4$
A5—26.9 bus. oats per acre, check talc and Attaclay
A6—35.8 bus. oats per acre, double percent of $ZnSO_4$
A7—24.6 bus. oats per acre, double percent of $MnSO_4$
A8—22.9 bus. oats per acre, check talc and Attaclay.
A9—33.8 bus. oats per acre, double percent of $CuSO_4$ A10—31.1 bus. oats per acre, percent of 11–48–0 phosphatic fertilizer built up to 25%.

(c) At Regina, Sask., spring wheat 10 dusts were standardized to 4% acid equivalent of ester of 2,4-D applied to young wheat at approximately 6 lbs. per acre. Base dust with the exception of the checks B2—B5—B8 were our standard Formula A. The variations between the treatments were obtained by doubling the percent of 2 elements of each formula yields are the average of 6 replicates on each treatment.

B1—28.55 bus. wheat per acre, Formula A base
B2—25.80 bus. wheat per acre, check talc and Attaclay—same border effect here
B3—21.90 bus. wheat per acre, double percent borax and $FeSO_4$
B4—23.75 bus. wheat per acre, double percent borax and $ZnSO_4$
B5—15.75 bus. wheat per acre, check talc and Attaclay
B6—30.00 bus. wheat per acre, double percent borax and $MnSO_4$
B7—23.65 bus. wheat per acre, double percent $FeSO_4$ and $ZnSO_4$
B8—18.95 bus. wheat per acre, check talc and Attaclay
B9—22.75 bus. wheat per acre, double percent $FeSO_4$ and $MnSO_4$
B10—16.65 bus. wheat per acre, double percent $MnSO_4$ and $ZnSO_4$ (d) At Regina, Sask., spring wheat 10 dusts were standardized to 4% acid equivalent of ester of 2,4-D applied to young wheat at approximately 6 lbs. per acre. Base dust with the exception of the checks C2—C5—C8 were our standard Formula A. The variations between the treatments were obtained by doubling the percent of 3 elements in each formula yields are the average of 6 replicates on each treatment.

C1—28.75 bus. wheat per acre, Formula A base
C2—not harvested, check talc and Attaclay
C3—21.70 bus. wheat per acre, double percent borax $FeSO_4$, $ZnSO_4$
C4—25.90 bus. wheat per acre, double percent borax $FeSO_4$, $MnSO_4$
C5—24.60 bus. wheat per acre, check talc and Attaclay
C6—31.95 bus. wheat per acre, double percent borax $MnSO_4$, $ZnSO_4$
C7—25.50 bus. wheat per acre, double percent $FeSO_4$, $MnSO_4$, $ZnSO_4$
C8—22.95 bus. wheat per acre, check talc and Attaclay
C9—27.55 bus. wheat per acre, double percent $MnSO_4$, $ZnSO_4$, $CuSO_4$
C10—29.80 bus. wheat per acre, double percent $FeSO_4$, $ZnSO_4$, $CuSO_4$ The experimental work which has been carried out reveals further data as to the overcoming of the damaging effects of 2,4-D and similar substances, and the supplementary data is set forth in Example 7.

*Example VII*

The University of Alta., Soils Department, Edmonton, obtained a yield of 114 bushels of oats per acre with no treatment. Where approximately 6 lbs. of dust per acre of 5% acid equivalent of 2,4-D is Attaclay talc and bentonite was applied at yield was reduced 16 bushels per acre. But where approximately 7 lbs. of dust per acre of 4% acid equivalent of 2,4-D in our fortified Formula A was applied, oat yield was reduced only 7.5 bushels per acre, i. e. 2,4-D with minerals did 8.5 bushels per acre less damage.

(b) The Dominion Experimental Farm, Lethbridge, Alta., obtained a yield of 28 bushels of spring wheat per acre with no treatment. Where approximately 8 lbs. of dust per acre of 5% acid equivalent of 2,4-D ester in Attaclay and talc was applied wheat yields were reduced 1.9 bushels per acre over the nontreatment. But where approximately 8 lbs. of dust per acre of 5% acid equivalent of 2,4-D ester with 10% $FeSO_4$ and 7% $CuSO_4$ and talc and Attaclay was applied wheat yields were increased 6.1 bushels per acre over the nontreatment.

(c) At the Dominion Experimental Farm, Scott. Sask., spring wheat dusted June 11th when small approximately 3 leaf stage, with six lbs. dust per acre of 4% acid of ester of 2,4-D in Attaclay and talc yielded 20.9 bushels wheat per acre.

A similar treatment applied 2 weeks later to the same crop yielded 26.0 bushels wheat per acre.

The very early treatment with 2,4-D alone apparently cut the yield of wheat 5.1 bushels per acre. However 6 lbs. of dust of our Formula B applied to the same crop on June 17th yielded 42.0 bushels per acre.

A similar treatment applied 2 weeks later to the same crop yielded 31.9 bushels per acre 10.1 bushels less than the early mineral hormone treatment.

The June 11th mineral hormone treatment not only overcomes the 5.1 bushels damage from 2,4-D alone but also yielded another additional 16 bushels of wheat per acre.

Increased efficiency in the form of a high percentage of grain in the bundle weight has been obtained by the use of the present invention. Illustrative results are set forth in Example 8.

*Example VIII*

At Regina Sask., spring wheat. 10 dusts were standardized to 4% acid equivalent of ester of 2,4-D and applied to young wheat at approximately 6 lbs. per acre. The base dust with the exception of the checks B2—B5—B8 were the standard Formula A. The variations between treatments were obtained by doubling the percent of 2 elements in each formula.

Percent of grain per bundle are averages of 6 replicates on each treatment were as follows:

B1—32.9% wheat, Formula A base
B2—35.9% wheat, check talc and Attaclay
B3—43.8% wheat, double percent of borax and $FeSO_4$
B4—37.8% wheat, double percent of borax and $ZnSO_4$
B5—30.9% wheat, check talc and Attaclay
B6—35.9% wheat, double percent of borax and $MnSO_4$
B7—33.6% wheat, double percent of $FeSO_4$, $ZnSO_4$
B8—30.0% wheat, check talc and Attaclay
B9—36.0% wheat, double percent of $FeSO_4$, $MnSO_4$
B10—28.0% wheat, double percent of $MnSO_4$ and $ZnSO_4$

*Example VIII (b)*

At Brandon, Manitoba, on barley, 7 dusts were standardized to 5% acid equivalent of ester of 2,4-D and applied to young barley at approximately 6 lbs. per acre. Base in each dust was talc and Attaclay and substituted with minerals as indicated below. Each treatment gave the following percentages of barley of the total bundle weight percent on averages of 6 replicates on each treatment.

G1—31.5% barley, A formula
G2—36% barley, talc and Attaclay plus 10% each of borax $FeSO_4$, $ZnSO_4$, $MnSO_4$ and 6% $CuSO_4$
G3—36% barley, talc and Attaclay plus 10% each of borax $FeSO_4$, $ZnSO_4$, $MnSO_4$, $CuSO_4$
G4—35% barley, check talc and Attaclay
G5—34% barley, talc and Attaclay plus 10% each of borax $FeSO_4$, $ZnSO_4$, $MnSO_4$, $CuSO_4$, 2% $CoSO_4$
G6—38% barley, talc and Attaclay plus 10% each of borax $FeSO_4$, $ZnSO_4$, $MnSO_4$, $CuSO_4$, 2% $CoSO_4$, 3% KBr
G7—39% barley, talc and Attaclay plus 10% each of borax $FeSO_4$, $ZnSO_4$, $MnSO_4$, $CuSO_4$, 2% $CoSO_4$, 3% KBr, 1% KI It has been observed that a high percentage of grain per bundle weight is obtained using potassium iodide and potassium bromide in conjunction with the preferred formulation containing a plant hormone and the minor elements. If it is desired to increase the percentage of grain in the total growth to an acre as expressed in harvested bundle weights the combinations of minor elements with hormones must be carefully adjusted to the specific species as otherwise decrease may result in comparison with crops treated neither with hormone nor with the minor elements if the minor elements are not properly selected and proportional.

Example 9 illustrates the application of the principle of this invention to flax.

Example 9

At Dauphin, check dusted with 4 lbs of dust, 5% acid of 2,4-D ester in Attaclay talc gave 21.7% flax of the total bundle weight treatment dusted with 5 lbs. of dust 4% acid equivalent of 2,4-D ester and minerals, Formula A gave 24.8% flax of the total bundle weight.

As has been previously indicated protein changes may be obtained by the practice of the present invention. It has repeatedly been noticed that there is an improvement of the kernel appearance of the wheat after it has been treated in accordance with this invention. Among the effects which have been noticed are better colour, more even maturity, less bleaching and desirable protein changes have appeared on analysis of the crop as is shown in Example 10.

In a series of tests at Verdin, Manitoba, on Durham wheat approximately 7 lbs. of dust per acre standardized to 4% acid of 2,4-D ester were applied with the following protein changes, 6 replicates were harvested from each treatment.

No. 1—9.5% protein, check Attaclay and talc
No. 2—9.75% protein, plus 5% FeSO4
No. 3—10% protein, plus 5% FeSO4, 5% MnSO4
No. 4—8.95% protein, plus 5% FeSO4, 5% MnSO4, 4% CuSO4
No. 5—10.1% protein, plus 5% FeSO4, 5% MnSO4, 4% CuSO4, 2½% CoSO4
No. 6—10.5% protein, plus 5% FeSO4, 5% MnSO4, 4% CuSO4, 2½% CoSO4, 2½% NiSO4
No. 7—10.6% protein, plus 25% of 11–48–0 phosphatic fertilizer
No. 8—9% protein. These plots had no treatment either of 2,4-D or minerals There were more visible changes to the kernels than the above protein figures would indicate. That is many of the mineral hormone treated plots showed much less starchiness islands or so-called pie-bold kernels.

As a generalization the use of the more complex mineral hormone treatments on spring wheats have often given striking changes in kernel appearance but as shown above there were not wide protein increases.

However on our experiments on winter wheat which have been more limited to date than the spring grains large increases in protein have been observed.

Lethbridge winter wheat treated at approximately 3 leaf stage in the fall with approximately 6 lbs. of dust per acre containing 4% acid of 2,4-D ester and 7% borax 30% sulphur 10% Attaclay and 48% calcium cyanamide gave a striking growth response and yield grain which analyzed 15% protein as compared to the checks which had no treatment of either minerals or hormones and analyzed 8.5% protein.

Winter wheat in Reardan and Pullman, Washington, treated with approximately 6 lbs. of dust per acre in the spring with our Formula A gave proteins as follows: Reardan 15.15%, Pullman 10.10%.

The check plots from the same fields treated with approximately 5-6 lbs. of check dust 5% acid of 2,4-D ester in Attaclay and talc gave proteins as follows: Reardan 10.70%, Pullman 8.75%.

Further data on protein changes is set forth in Example I.

It has been noted that generally speaking treatments in accordance with the present invention have the effect of hastening the maturity of similar grain crops. The improvement ranges between a few days and a week. While the contemplated treatments often hold the top leaves and upper stems green longer it has been found that the heads fill better and mature rapidly.

It has been noticed on a number of occasions that early frosts did considerably more damage to plots which had been treated only with 2,4-D as compared with plots treated in accordance with the present invention.

Sometimes when the treatments in accordance with the present invention have given very marked growth responses there may be a slight delay in maturity.

It will be appreciated that although the present examples illustrate the application of the minor elements together with a plant hormone in the form of a dust, the present invention is equally applicable to the use of a plant hormone together with the minor elements in the form of a spray.

We claim:

1. A composition for general purposes as a dust to leaf feed crops in quantities of 6 to 7 pounds to an acre on small grains comprising the following substances in the approximate proportions shown: 1 part acid equivalent of a 2,4 dichlorophenoxyacetic acid compound:

2 parts borax
2 parts manganese sulphate
2 parts zinc sulphate
1 part copper sulphate
1 part ferrous sulphate
5 parts sulphur 2. A composition for leaf feeding crops comprising a plant hormone and a mixture of minor element compounds, said compounds being in a form assimilatable by the leaves of plants and being present in an amount sufficient substantially to satisfy by leaf feeding deficiencies within the plants of the crop of said minor elements under the conditions of artificially stimulated growth produced by quantities of said hormone producing a herbicidal effect on weeds associated with said crop.

3. A composition as in claim 2 in which said compounds include compounds of each of the elements iron, copper, boron, manganese and zinc.

4. A composition as in claim 2 in which said hormone comprises a 2,4 dichlorophenoxyacetic acid compound.

5. A composition as in claim 2 in which said hormone comprises a 2,4,5 trichlorophenoxyacetic acid compound.

6. A composition for leaf feeding crops comprising a plant hormone and a mixture of soluble minor element compounds, said minor element compounds being present in an amount sufficient substantially to satisfy deficiencies within the plants of the crop of said minor elements under the conditions of artificially stimulated growth produced by said hormone when said hormone is applied to the crops in an amount sufficient to produce a herbicidal effect on weeds associated with said crop.

7. A composition for application as a dust to leaf feed crops comprising a plant hormone in a proportion sufficient to produce a herbicidal effect on weeds upon the application of said composition in an amount of a few pounds per acre and a mixture of soluble minor element compounds substantially to satisfy deficiencies within the plants of the crop of said minor elements under the conditions of artificially stimulated growth produced by said hormone.

8. A composition as in claim 7 in which said minor elements are selected from the group consisting of boron, manganese, zinc, copper, iron, cobalt and molybdenum.

9. A method of increasing the yield of emergent crops comprising applying to said emergent crops a plant hormone in a quantity sufficient to produce a herbicidal effect on weeds, and at substantially the same time leaf feeding said crops with a mixture of minor element compounds, substantially to satisfy deficiencies within the plants of the crop of said minor elements under the conditions of artificially stimulated growth produced by said hormone, said minor element compounds being in assimilatable form.

10. A method of increasing the yield of emergent crops comprising applying by leaf feeding to said emergent crops a composition in dust form in an amount of a few pounds to an acre, said composition comprising a plant hormone in a quantity sufficient to produce a herbicidal effect on weeds and a mixture of minor element compounds in assimilatable form substantially to satisfy deficiencies within the plants of the crop of said minor elements under the conditions of artificially stimulated growth produced by said hormone.

References Cited in the file of this patent

UNITED STATES PATENTS

| | | |
|---|---|---|
| Re. 23,115 | Lontz | May 24, 1949 |
| 2,218,695 | Leatherman | Oct. 22, 1940 |
| 2,280,451 | Riddle | Apr. 21, 1942 |
| 2,350,982 | Borst | June 13, 1944 |
| 2,390,941 | Jones | Dec. 11, 1945 |
| 2,472,347 | Sexton | June 7, 1949 |

FOREIGN PATENTS

| | | |
|---|---|---|
| 492,596 | Great Britain | Sept. 19, 1938 |

OTHER REFERENCES

Camp and Francis: "The Making, Shaping, and Treating of Steel," 5th edition (1940), pages 216 and 433.